United States Patent [19]

Simpson

[11] 4,417,132
[45] Nov. 22, 1983

[54] APPARATUS FOR HEATING ELECTRICALLY CONDUCTIVE FLOWABLE MEDIA

[75] Inventor: David P. Simpson, Westminster Park, England

[73] Assignee: The Electricity Council, England

[21] Appl. No.: 225,073

[22] Filed: Jan. 14, 1981

[30] Foreign Application Priority Data

Jan. 21, 1980 [GB] United Kingdom ................. 8001995

[51] Int. Cl.³ .......................... H05B 3/60; A23L 3/32
[52] U.S. Cl. .................................... 219/291; 219/284; 219/288; 219/289; 204/308; 426/244; 426/522
[58] Field of Search ............... 219/284, 291, 288, 289, 219/10.81; 99/451; 204/186, 302–308; 426/244, 247, 521, 522; 210/748

[56] References Cited

U.S. PATENT DOCUMENTS

| 918,531 | 4/1909 | Goucher | 99/451 |
|---|---|---|---|
| 1,147,558 | 7/1915 | Shelmerdine | 99/451 |
| 3,053,667 | 9/1962 | Luijerink | 99/107 |
| 3,313,721 | 4/1967 | Teel | 204/280 |
| 4,013,567 | 3/1977 | Emelyanov | 250/540 |

FOREIGN PATENT DOCUMENTS

| 26743 | of 1912 | United Kingdom . | |
|---|---|---|---|
| 297669 | 11/1929 | United Kingdom | 426/522 |
| 526238 | 9/1940 | United Kingdom . | |
| 682263 | 11/1952 | United Kingdom . | |
| 895141 | 5/1962 | United Kingdom . | |
| 1161366 | 8/1969 | United Kingdom . | |
| 1201655 | 8/1970 | United Kingdom . | |
| 1408161 | 10/1975 | United Kingdom . | |

OTHER PUBLICATIONS

McDowell, F. H., "Pasteurization of Milk by Electricity", The New Zealand Journal of Science and Technology, Feb. 1929, pp. 275-291.

Primary Examiner—B. A. Reynolds
Assistant Examiner—Teresa J. Walberg
Attorney, Agent, or Firm—Beveridge, De Grandi & Kline

[57] ABSTRACT

A heater for liquid foodstuffs has a pipe through which the foodstuff flows and electrodes spaced along the pipe to drive a heating current through the foodstuff. In the embodiment, the electrode is a platinum coated cylinder arranged transversely in an enlarged part of the pipe so that electric current flows to the electrode only over a smooth surface portion, entirely within the edges of the exposed electrode surface.

13 Claims, 6 Drawing Figures

APPARATUS FOR HEATING ELECTRICALLY CONDUCTIVE FLOWABLE MEDIA

BACKGROUND OF THE INVENTION

This invention is concerned with apparatus for heating electrically conductive flowable media, typically liquids. It is commonly necessary to heat flowable media to elevated temperatures for example to perform a chemical reaction, or, where the flowable medium is a foodstuff, to cook or sterilise the foodstuff. Conventional methods of applying heat to flowable media such as liquids include plate heat exchangers, autoclaves, steam or hot water-jacketed vessels and hot-air ovens. Such conventional methods may provide certain problems arising, for example, from the uneven temperature distribution established in the media according to the laws of heat conduction from a hot surface into the cold medium. Further, the rate of heat input into the medium is dependent on the surface area of the heating element in contact with the medium and the maximum temperature to which the medium immediately adjacent the heating surface can be raised without some deleterious effect. For example, in the heating of liquid foodstuffs such as dairy products requiring pasteurisation or sterilisation, the product is liable to protein denaturation at an excessively hot heat exchange surface. Futhermore, the surface area of the heat exchanger is also restricted since high surface areas entail fine mesh heat exchange structures which restrict flow of the media and can readily be fouled by viscous media or media with solid particles entrained. Furthermore, fouling of the heat exchange surface can occur due to the excessive temperature at the heat exchange surface, which again leads to a diminished heat transfer rate from the fouled surface which progressively compounds the problem. Fouling also increases the pressure drop required across the heat exchanger to ensure flow of the medium.

Canned produce containing meat, vegetable or fruit components in a liquid base are commonly autoclaved to achieve sterility. Over-cooking can occur at the can's surface with consequent loss of texture, flavour and nutritional value. Further, certain delicate foods containing, for instance, a yogurt or starch base, could benefit from a sterilising process offering very rapid heating rates which themselves can be difficult to achieve with known hot surface heat exchanged techniques.

It is already known to heat flowable media such as liquids by causing an electric current to flow directly in the media between pairs of electrodes. Such direct electrical ohmic heating of the medium can permit high rates of heat input to the medium so enabling relatively rapid heating rates. The basic problem of heating by conduction from a hot heat exchanger surface is also obviated. Proposals for ohmically heating liquids, specifically for pasteurising milk, are described in the article entitled "Pasteurisation of Milk Electricity", by F. H. McDowall, pages 275 to 291 of The New Zealand Journal of Science and Technology, February 1929. The "Electro-Pasteur" described in this article ohmically heats milk by electric currents flowing between electrodes spaced at intervals along a pipe through which the milk is flowing. Thus, the electric current flows parallel to the direction of flow of the milk.

A major problem with apparatus for electrically heating flowable media of the kind described above is in the design of the electrodes. It is normally important, especially with foodstuffs, to ensure that the electrodes do not contaminate the medium being heated. Difficulty has also been experienced hitherto in preventing excessive fouling of the electrodes and also of the walls of the pipe immediately adjacent where the electrodes are mounted.

SUMMARY OF THE INVENTION

According to the present invention, apparatus for heating an electrically conductive flowable medium comprises pipe means through which the medium can be arranged to flow and which is made of or internally lined with a material having an electrical conductivity no greater than that of the medium, at least two electrodes at spaced locations along the pipe means and having respective electrode surfaces exposed to medium flowing in the pipe means, and supply means for applying an alternating electrical supply across said electrodes so that alternating current can flow in the medium between the electrodes, each electrode being located and arranged in the pipe means such that, in use, substantially all the current flows between the medium and a predetermined surface portion only of the exposed electrode surface, said surface portion being smooth and entirely within the edges of the exposed surface. It has been found, particularly when electrically heating foodstuffs, that the degree of fouling of the electrodes with burnt-on material is dependent on the current density at the exposed electrode surface. The current density is in turn dependent upon the electric field distribution at the surface and by ensuring that the surface portion over which current is flowing between the medium and the electrode is smooth, fouling of the surface can be minimised whilst the amount of current which can be injected from the electrode into the medium can be maximised.

Preferably, the smooth surface portion of the exposed surface of the electrode has a constant radius of curvature. This arrangement is the most convenient way of minimising local variations of current density at the electrode surface which might otherwise cause local fouling of the electrode surface.

It has also been observed that there is a tendency, especially when heating some materials such as milk or custard, for fouling to be concentrated at the regions of the exposed electrode surface immediately adjacent to electric field discontinuities. Such discontinuities may occur where the electrically conducting material of the electrode, immersed in a relatively poorly-conducting fluid to be heated, passes through a fluid-tight mechanical seal into an electrically insulating housing. Then, it has been observed that the electrode surface becomes particularly fouled at the interface between the electrode surface and the walls of the electrode housing. However, with the arrangement of the present invention, substantially all the current flows between the medium and a predetermined surface portion only of the exposed electrode surface and this predetermined surface portion is entirely within the edges of the exposed surface. Thus, there is substantially no current flow between the electrode and the medium at the regions of the exposed surface of the electrode which are immediately adjacent the walls of the electrode housing or other electrically non-conducting surfaces. Since the fouling or building up of material on the electrode surface is primarily a current-driven phenomenon, any electric field discontinuities which may still arise at the junctions between the electrode surface and the insulating housing surface cause minimal fouling.

In a preferred example of the apparatus, at least one of the electrodes is cylindrical with the axis of the cylinder transverse to the direction of flow of medium past the electrode and the exposed length of the cylinder extending at each end of the cylinder outside the side walls of the length of the pipe means between the electrodes so that said surface portion of the surface of the cylinder extends along the cylinder less than said exposed length of the cylinder. This arrangement is conveniently embodied by locating the cylindrical electrode is an enlarged portion of the pipe means having a dimension transverse to the direction of flow of medium greater than that of the length of the pipe means between the electrodes. It will be appreciated that provided the distance between the electrode surface and the entrance of the length portion of the pipe means after the enlarged portion is not much greater than the amount by which the exposed surface of the electrode extends outside the width of the length portion of the pipe means, current flowing in the medium on the length portion of the pipe means will flow on to or from the surface of the electrode only in a defined region thereof occupying less than the entire exposed length of the electrode.

Preferably, the interior walls of the enlarged portion of the pipe means are circularly curved in planes perpendicular to the axis of the cylindrical electrode. In one example, the interior walls of said enlarged portion are spherically curved. Alternatively, the interior walls may be cylindrically curved with the cylindrical axis parallel to the axis of the cylindrical electrode.

Conveniently, said enlarged portion of the pipe means comprises a separable electrically insulating electrode housing in which said electrode is mounted.

It has also been found desirable in some circumstances, to arrange for each electrode to be hollow and to provide means for passing a cooling fluid through the electrode to cool the walls and hence the exposed surface of the electrode. The viscous drag on medium flowing past the stationery surface of the electrode causes the medium immediately adjacent the electrode to remain exposed to the effect of the electric current for an excessive time. This can result in material immediately adjacent the electrode surface being overheated and burnt on to the electrode surface, fouling the surface. Cooling the electrode surface can counteract this effect.

In one arrangement, hollow cylindrical electrodes may be employed which are open-ended and extend between opposed openings in the walls of the pipe means which fit sealingly around the electrode. Then means may be provided for communicating through the openings in the walls of the pipe means with the open ends of the electrodes to supply cooling fluid to the electrodes.

Clamping means may be provided to clamp the electrode in place and the clamping means may be arranged to compress the material of the pipe means around said opposed openings against the outer surface of the electrode to provide a fluid-tight seal.

It is important that the electrodes do not suffer excessive electrolytic erosion during operation of the apparatus and it is preferred for the electrodes to have exposed surfaces of platinum. The electrode may be made of titanium with a platinum coating on the exposed surface.

An example of the present invention will now be described with reference to the accompanying drawings.

DETAILED DESCRIPTION OF THE INVENTION

Figure 1:
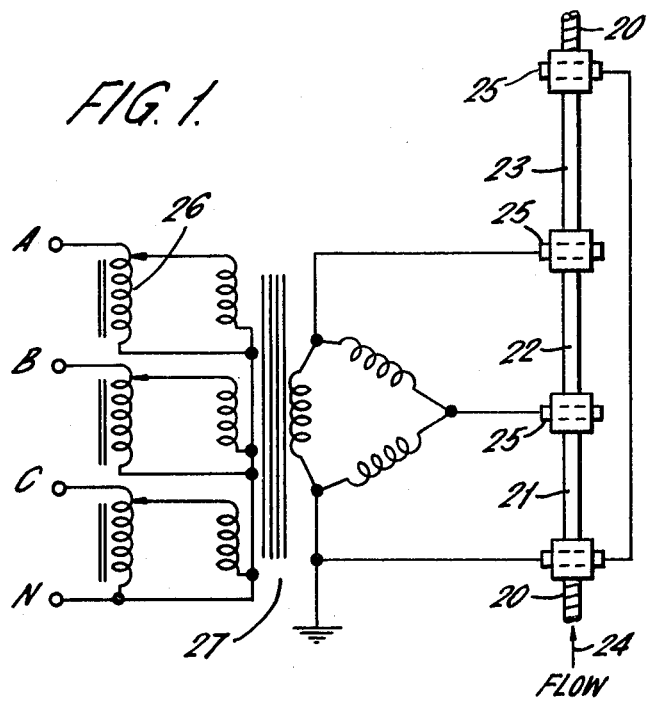
FIG. 1 illustrates an apparatus for electrically heating a flowable medium and in which the present invention can be embodied.

FIG. 1 illustrates an example of apparatus for electrically heating flowable media in which the present invention can be embodied. In FIG. 1, there is indicated generally at 20 a pipe for the flowable medium which is to be heated. The medium is typically a liquid for example a flowable foodstuff which is to be heated for cooking or sterilising. The pipe 20 is connected, in use, to means such as a positive displacement pump for producing a flow of the medium in the direction of arrow 24 through the pipe. Such means might comprise a pump conveying the foodstuff from one vat to another in a foodstuff treatment process. As shown in FIG. 1, the pipe 20 has sections 21, 22 and 23 which are made so that the material flowing inside these sections is electrically insulated from the outside of the pipe. To achieve this the pipe sections may be made entirely from insulating materials, or the pipe sections may be internally lined with an insulating material. It is preferable that the insulating material employed is a "good" insulator, i.e. having a very low electrical conductivity, although the apparatus can be made to work provided the conductivity of the insulating material employed is less than that of the medium flowing in the pipe.

The insulating pipe sections 21, 22 and 23 space apart four electrodes 25. The electrodes 25 are each arranged to have electrode surfaces which are exposed to medium flowing in the pipe 24. A three-phase autotransformer 26 connected to a three-phase step up transformer 27 is arranged to provide variable alternating voltage supply for example from the mains three-phase electricity supply at 440 V. The delta-connected secondary windings of the transformer 27 are connected to the electrodes 25 with one terminal of the secondary windings connected to earth and to the electrodes at either end of the heater portion of the pipe 20, i.e. the uppermost and lowermost electrodes 25 in FIG. 1. The other two terminals of the secondary windings are connected to respective ones of the two intermediate electrodes 25. It can be seen, therefore, that a different phase of alternating voltage is applied between each adjacent pair of electrodes 25, but in each case the R.M.S. voltage applied across the electrodes is the same. Having the outer two electrodes earthed, minimises any risk of current flowing in the medium either before the inlet or after the outlet of the heating portion of the pipe 20. Provision may be made to cool the interior surfaces of the pipe sections 21, 22 and 23 for example by forming these pipe sections as double-skinned pipes with a water-cooling jacket between the skins. Cooling the pipe sections has been found desirable to reduce fouling of the internal surfaces of these pipe sections.

Figure 2:
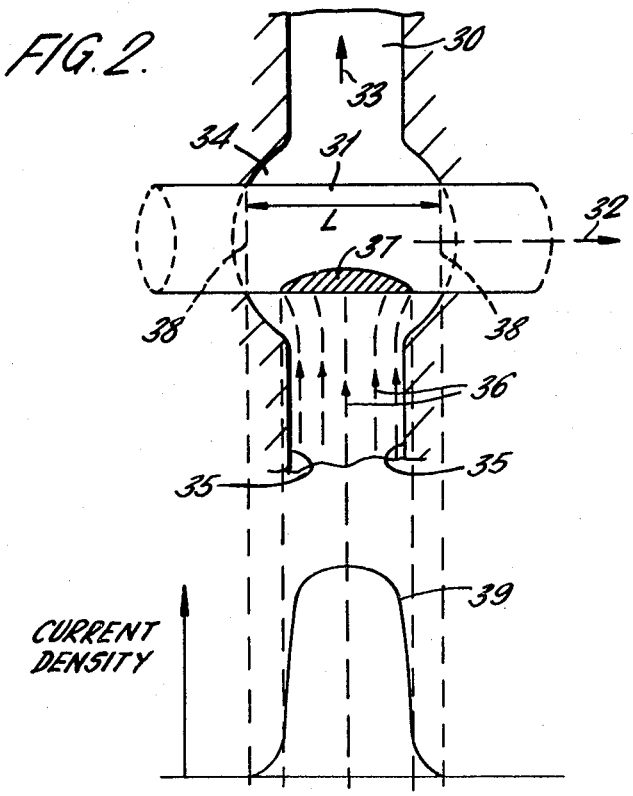
FIG. 2 is a diagrammatic illustration of an electrode arrangement for use in the apparatus of FIG. 1 together with a graphical representation of the distribution of current density over the electrode surface.

Referring now to FIG. 2, the upper part of the figure is a schematic illustration of an example of one of the electrodes 25 which embodies the present invention. The pipe 20 is generally indicated by the flow passage 30 in FIG. 2. The electrode 25 is formed as a cylinder 31 having its axis 32 extending transversely across the direction of flow 33 of medium in the pipe 30. The cylindrical electrode 31 is located in an enlarged portion 34 of the pipe 30 so that, as can be seen in FIG. 2, the exposed length L of the surface of the cylinder 31 extends at either end outside the side walls 35 of the length of pipe 30 extending from the electrode 31 to the next electrode along. The arrangement of FIG. 2 is such that current flowing in the medium in the pipe 30 (indicated by the dashed lines and arrows 36) is absorbed on to the surface of the electrode 31 only over a predetermined region 37 of this surface. Furthermore, the region 37 lies wholly within the boundaries of the surface of the electrode 31 which is exposed to medium in the pipe 30. In the example of FIG. 2, the enlarged region 34 of the pipe 30 is formed with spherical wall surfaces so that the boundaries of the exposed surface of the cylindrical electrode 31 extend circularly around the electrode as indicated in FIG. 2 by the lines 38. It will be appreciated that the current density at the surface of the electrode 31 falls off with increasing distance from the surface to the adjacent electrode along the pipe 30. Thus, the shape of the enlargement 34 and the cylindrical electrode 31 as shown in FIG. 2 confines the region 37 of substantial current density at the surface of the electrode as shown. The importance of this is in minimising the current density at the surface of the electrode 31 immediately adjacent the boundaries 38. It has been found that the electric field discontinuities at such boundaries can cause excessive fouling of the electrode surface in the vicinity of the boundaries unless the current density in these boundary areas is kept very low.

The distribution of current density across the length of the cylindrical electrode 31 is illustrated graphically by the curve 39 and it can be seen that the density falls off sharply over the exposed surface portions which are outside the side walls 38 of the pipe 30.

Figure 3:
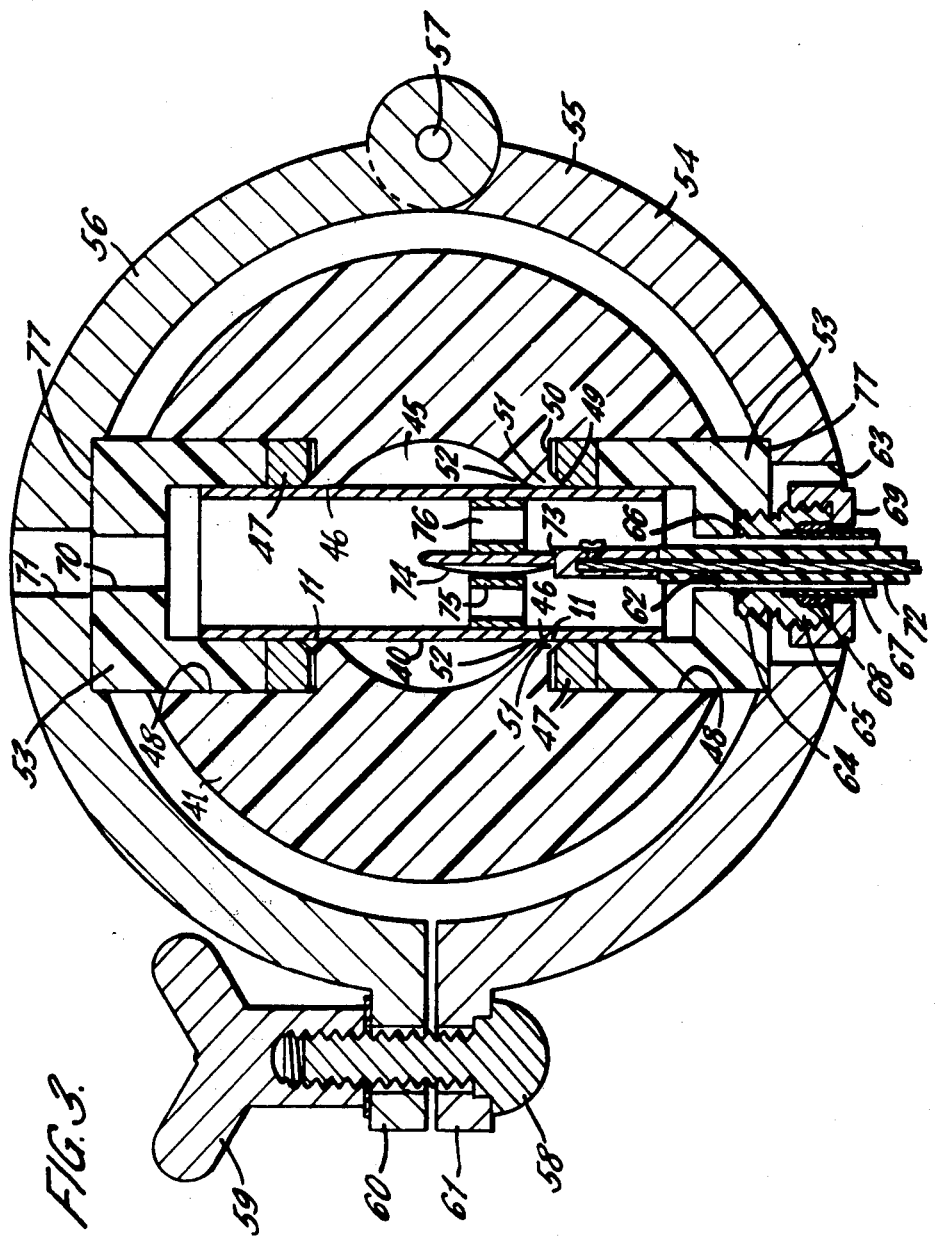
FIG. 3 is a cross-sectional view of a preferred embodiment of electrode assembly for use in the apparatus of FIG. 1 taken in a plane which is transverse to the direction of flow of medium to be heated in the apparatus of FIG. 1.
Figure 4:
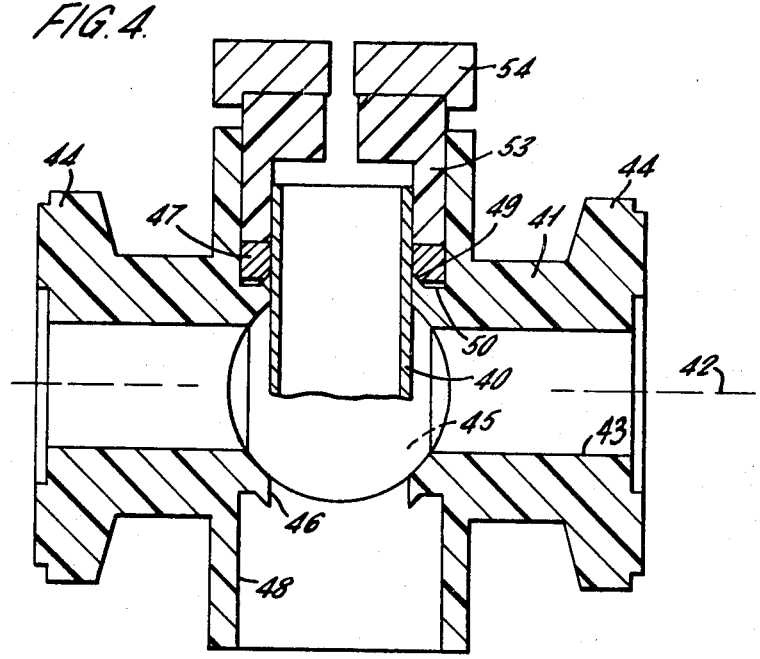
FIG. 4 is a further partial cross-sectional view of the electrode assembly of FIG. 3 taken in a plane parallel to the direction of flow of medium.

FIGS. 3 and 4 illustrate in greater detail a particular example of electrode and electrode assembly of the kind described with reference to FIG. 2. FIG. 3 is a cross-sectional view of an electrode assembly taken in a plane containing the axis of the cylindrical electrode and perpendicular to the direction of flow of the medium in the pipe. On the other hand, FIG. 4 is a partial cross-sectional view of the assembly in a plane also containing the axis of the cylindrical electrode but parallel to the direction of flow of medium. Referring to FIG. 4, the cylindrical electrode 40 is mounted in an electrode housing 41. The electrode housing 41 is generally a cylindrical block of insulating material, preferably P.T.F.E. or some other suitable plastics material selected to withstand the chemical and thermal conditions at the appropriate point in the heating apparatus. Suitable dimensions for the housing 41 for use in the heating apparatus of FIG. 1 when the pipe 20 has a 25 mm bore, are 120 mm in length and 100 mm in diameter. Along the centre line 42 of the housing 41 there is a cylindrical bore 43 having a diameter, 25 mm, which exactly matches the internal diameter of the adjacent pipe section to which the housing 41 is attached in the apparatus. At each end of the housing 41 annular flanges 44 surround the entrances to the bore 43 and are designed to enable a fluid-tight seal to be made with the adjacent pipe section of the heating apparatus. Further details of preferred forms of pipe section for use with the electrode assembly illustrated in FIGS. 3 and 4 are described and claimed in our co-pending application Ser. No. 224,855, filed Jan. 13, 1981. This co-pending application also illustrates how the housing 41 can be connected to the adjacent pipe sections by means of three-piece hinged clamps engaging the flanges 44.

At the mid point of the bore 43, the bore is opened out to form an enlargement 45 which has substantially spherical wall surfaces. The diameter of the spherical enlargement 45 is approximately twice the diameter of the bore 43, i.e. 50 mm in the present case.

The electrode 40 comprises an open-ended hollow cylinder made preferably of titanium with its external surface coated with platinum. The electrode 40 is mounted in the housing 41 at the point of the enlargement 45 and is supported in the housing between two opposed circular ports 46 centrally located on opposite sides of the enlarged portion 45. The ports 46 are carefully dimensioned so that the electrode 40 makes a close fit in the ports 46. Only one end of the electrode 40 is shown in FIG. 4 for clarity. The electrode 40 is mounted in the ports 46 so that the axis of the cylinder is perpendicular to the axis of the bore 43 and hence to the direction of flow of medium to be heated. The diameter of the cylindrical electrode 14 in the present example is substantially equal to the diameter of the bore 43, and of the rest of the pipe 20. However, it will be appreciated that the choice of size of the electrode 40 is dependent on the maximum current density which can be experienced at the surface of the electrode without degrading or spoiling the medium being heated or causing excessive fouling of the electrode surface. With a cylindrical electrode 40 having a diameter of substantially the same as that of the bore 43, the current density at the surface of the electrode can be maintained approximately the same as the current density in the medium flowing along the bore 43 and the intervening pipe sections. That is to say focusing of the current at the electrodes can be minimised.

Referring now to FIG. 3, the electrode 40 is secured and sealed in the ports 46 by means of pressure rings 47 conveniently fabricated of stainless steel, which make a sliding fit on the electrode 40 in the annular spaces provided by counter bores 48 extending from the port 46 to the outside surface of the housing 41. The pressure ring 47 has a 45° chamfer 49 on one inside edge which engages a corresponding 45° lip on the end face 50 of the counter bore 48. The chamfer 49 and the lip are so dimensioned that a gap of about 1 mm is left between the front face of the ring 47 and the end 50 of the counter bore.

By suitable choice of thickness of the material of the housing 41 in the region 51, between the end 50 of the counter bore and the inner surface 52 of the housing, the plastics material in the region can be caused to deform in an inwards direction and parallel to the axis of the electrode 40 when the pressure ring 47 exerts pressure on the lip at the end 50 of the counter bore 48. This distortion can effect a fluid-tight seal at the inner surface 52 of the enlargement 45 immediately adjacent the aperture 46 where it meets the surface of the electrode 40. In this way, an essentially crevice-free seal can be made between the housing material and the electrode. This is particularly important for heating apparatus designed to handle food products, where the use of "in-place" cleaning which is now becoming standard practice, requires all food contacting surfaces to be joined in an essentially crevice-free manner. Suitable dimensions for the length of the land on the cylindrical surface of the region 51 co-operating with the electrode 40, in the case of a housing of P.T.F.E. having a bore 43 of 25 mm diameter and a cavity 45 of 50 mm diameter with an electrode 40 of 25 mm diameter, would be about 2 to 3 mm. This has been found to be suitable to produce a good seal against internal over-pressures up to 100 p.s.i.g. at working temperatures of, say, 150° C. and with the application of only modest sealing forces on the pressure rings 47.

The sealing force is applied to the pressure ring 7 and thence to the lips by means of caps 53 which are made of a material, for example, P.T.F.E., which is suitable for transferring the compressive force to the rings 47 from a clamping ring 54. It is also important that the cap 53 is a good electrical insulator so that any voltages present on electrode 40, and hence on pressure rings 47 are not transmitted to the clamping ring 54. The dimensions of the caps 53 are chosen so as to give a sufficient tracking length between the electrically live components 40 and 47 and the clamping ring 54.

For applications requiring only modest or no internal overpressure, it would be possible to dispense with the pressure rings 47 and transfer the sealing force directly to the lips by use of extended insulating caps 53. However, substantial sealing forces might result in the distortion of the front face of the caps 53 engaging the lips at the end 50 of the counter bores 48, and this distortion of the caps 53 might take place instead of the desired distortion of the regions 51 of the housing.

The clamping ring 54 is fabricated, in a suitably strong manner, for example, from machined and welded stainless steel, in two parts 55 and 56 which are pivoted at 57 and joined at a point diametrically opposed to the pivot 57 by means of a clamping screw 58 which co-operates with a wing nut 59. The bolt 58 and wing nut 59 operate on lugs 60 and 61 welded to the parts 55 and 56 of the clamping ring 54 and provision is made to allow the wing nut and bolt to be pivoted outwards relative to the part 55 of the clamping ring so as to disengage the part 56 completely so allowing the two parts of the clamping ring 54 to be opened out for removal from the electrode assembly. This enables the electrode assembly to be quickly and conveniently disassembled without the need of special tools. It has been found that with a 25 mm bore system, effective pressure-tight sealing can be effected wit this simple clamping system and requiring only hand tightening of the wing nut 59.

At least one of the end caps 53 has an axial orifice 62 which registers with a larger orifice 63 in the part 55 of the clamping ring 54. The orifice 62 is counter bored and tapped at 64 so as to receive a standard stud end hose connector 65 which when screwed home makes a fluid-tight seal with the cap 53 by means of an O-ring 66. The connector 65 supports the end of a hose 67 which is sealed into the connector 65 by means of an olive 68 and nut 69.

The hose 67 carries a supply of cooling fluid for the electrode 40 and it can be seen that cooling fluid passing along the hose 67 passes through the aperture 62 in the cap 53 directly into the interior of the electrode 40. A further aperture 70 is provided in the other cap 53 and aperture 70 registers with a corresponding aperture 71 in the part 56 of the clamping ring 54. Cooling fluid entering the electrode 40 can leave through the apertures 70 and 71.

It has been found advantageous to cool the electrode 40 in this way since cooling can reduce the amount of fouling of the exposed electrode surface. This fouling is thought at least in part to be caused by viscous drag exerted by the electrode on the medium flowing past the electrode. As a result, the medium immediately adjacent the surface of the electrode can remain in the region of high electric current density rather longer than medium flowing straight past the electrode with the result that the medium immediately adjacent the surfaces of the electrode can become excessively heating causing fouling of the electrode surface. By cooling the electrode, heat can be removed from the medium immediately adjacent the surface of the electrode thereby diminishing the amount of fouling. It has been found sufficient to use air as the cooling fluid in which case no further connection need be made to the aperture 70 and the air leaving the electrode 40 can be allowed to escape to the atmosphere. However, if a cooling liquid is employed, then clearly some further liquid connection must be made to the aperture 70 to lead the cooling liquid away for disposal or re-circulation. Furthermore, it has also been found that in certain circumstances, it is desirable to heat the electrode 40, by means of a heating fluid supplied through the hose 67. For example, the electrode at the upstream end of the heating apparatus can advantageously be heated in this way.

The hose 67 may conveniently be made of a suitable insulating material, such as nylon which is also suitable for use with the appropriate heating or cooling fluid. Then, the hose 33 can also be used as an additional protection to an electric supply cable 72 contained inside the hose 67. The electric supply cable 72 feeds through the hose connector 65 and the aperture 62 in the cap 53 into the interior of the electrode 40 where connection is made to the electrode by means of a conventional "banana" plug 73 mating with a hole 74 in a contact block 75. The contact block 75 may conveniently be made of brass or some other suitable electrically conductive material which is relatively soft. It is important that the block 75 is made to form a tight friction fit in the wall of the electrode 40 so as to make good electrical contact with the electrode. The block 75 is provided with a number of orifices 76 to enable the cooling or heating fluid to pass through the electrode 40 and escape via the orifice 70 in the other cap 53. Care is taken to ensure that the cable 72 and plug 73 are only exposed from the cable insulation at a safe distance from the connector 65 which may be made of metal.

As can be seen in FIG. 3, the aperture 63 in the part 55 of the clamping ring 54 is made sufficiently large to accommodate the nut 69 and the hose connector 65 so that the clamp can be released and slid back along the hose 67 to allow disassembly of the end caps 53 and associated components for cleaning and maintenance etc. It has also been found advantageous to provide counter bores 77 as illustrated in FIG. 3 on the inner surfaces of the parts 55 and 56 of the clamping ring to locate the clamping ring on the outer ends of the caps 53.

As mentioned previously, the preferred material for the electrode 40 is titanium with a deposition of platinum, the platinum being some 10 μm thick. The integrity of the platinum coating is important as fouling occurs rapidly in use on exposed areas of titanium. Electrodes made solely of platinum would be suitable, though expensive. In particular, it must be understood that the range of materials which are permitted to be in contact with foodstuffs is very restricted and only a few of those permitted materials would be suitable as electrode material in an apparatus of the present kind used for heating foodstuffs. A possible alternative is graphite or carbon, or carbon-based composites with plastics material. Carbon or molybdenum would also be suitable for use in a different application for heating dyestuffs or other organic chemicals.

Figure 5:
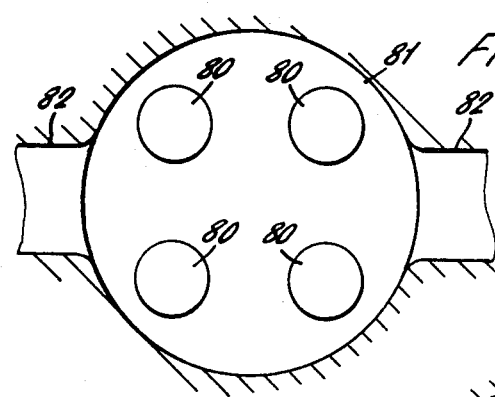
FIGS. 5 and 6 are diagrammatic representations of two different embodiments of electrode assembly.

Although a cylindrical electrode has been described by way of example in the above, other forms of electrode would be possible provided they have no sharp edges or small radii of curvature, i.e. their exposed surfaces are substantially smooth. In one alternative arrangement, as illustrated in FIG. 5, four cylindrical electrodes 80 can be arranged in a single enlarged cavity 81, the electrodes 80 being connected together to one electrical supply terminal. The purpose of using such an array of electrodes is to provide an electrical field profile which is essentially similar to that produced by a single cylindrical electrode of diameter approximately equal to the diagonal spacing of the four electrodes illustrated in FIG. 5. The use of four electrodes increases the active surface region of the electrodes at which there are substantial current densities and further can permit a relatively large open area through the electrode assembly for the passage of entrained solids in the medium being heated. In the example of FIG. 5, the openings between the electrodes 80 transversely of the direction of flow can be substantially the same as the diameter of the flow passages 82 on either side of the cavity 81. Various further mitigating measures may be employed if fouling of the electrodes is still found to be a problem in an apparatus operating with particular media.

Figure 6:
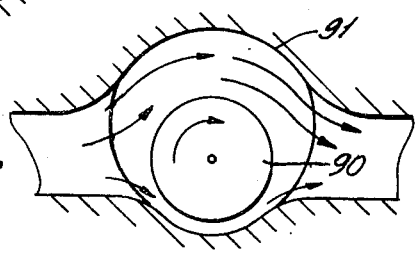

For example, means may be provided for linearly actuating the cylindrical electrodes of the example described above to enable the surface of the electrode to be scraped to remove fouling. Alternatively, a more widespread distribution of electrical current over the surface of the electrodes can be obtained by rotating the cylindrical electrode on its axis so that build up of fouling over any one region is delayed. The arrangement of FIG. 6 may be employed to cause a cylindrical electrode 90 to rotate automatically in response to the flow of medium past the electrode. The asymmetrical shape of the cavity 91 produces a differential drag on the electrode 90 causing it to rotate. Another possible shape for the electrode is a toroid with the major axis of the toroid coinciding with the flow direction of the medium being heated. The central orifice of the toroid may be made greater than or equal to the diameter of the flow passages of the heating apparatus and the toroid may be supported in an enlarged cavity in the flow passages by means of a small diameter supporting structure which can feed the electrical current to the electrode.

Conveniently, the pipe sections of the heating apparatus are arranged substantially vertically so that any dissolved gases in the medium being heated can rise and escape from the system. A zig-zag arrangement of the pipe sections may be used to conserve vertical space.

What is claimed is:

1. Apparatus for heating an electrically conductive flowable medium, comprising pipe means through which the medium can be arranged to flow, said pipe means having an internal surface of a material having an electrical conductivity no greater than that of the medium, at least two electrodes at spaced locations along the pipe means and having respective electrode surfaces exposed to medium flowing in the pipe means, and supply means for applying an alternating electrical supply across said electrodes so that alternating current can flow in the medium between the electrodes, each lectrode being located and arranged in the pipe means such that, in use, substantially all the current flows between the medium and a predetermined surface portion only of the exposed electrode surface, said predetermined surface portion being smoothly curved without sharp edges to avoid current density distortions over the surface portion, said predetermined surface portion being entirely within the edges of the exposed surface.

2. Apparatus as claimed in claim 1 wherein said smooth surface portion has a constant radius of curvature.

3. Apparatus as claimed in claim 2 wherein at least one of the electrodes is cylindrical, with the longitudinal axis of the cylinder transverse to the direction of flow of medium past the electrode, and with the exposed electrode surface at each end of the cylinder extending outside the projection of the side walls of the length of the pipe means onto said cylinder, so that said surface portion of the cylinder extends along the cylinder less than the length of said exposed electrode surface.

4. Apparatus as claimed in claim 3 wherein the cylindrical electrode is located in an enlarged portion of the pipe means having a dimension transverse to the direction of flow of medium greater than the dimension of the pipe means transverse to the direction of flow of the medium between the electrodes.

5. Apparatus as claimed in claim 4 wherein the interior walls of the enlarged portion of the pipe means are circularly curved in planes perpendicular to said longitudinal axis of the cylindrical electrode.

6. Apparatus as claimed in claim 5 wherein the interior walls of said enlarged portion are spherically curved.

7. Apparatus as claimed in claim 5 wherein the interior walls of said enlarged portion are cylindrically curved with the cylindrical axis parallel to said longitudinal axis of the cylindrical electrode.

8. Apparatus as claimed in any one of claims 4 to 7, wherein said enlarged portion comprises a separate electrically insulating electrode housing in which said electrode is mounted.

9. Apparatus as claimed in claim 3 wherein each electrode is hollow, said apparatus further comprising means for passing a cooling fluid through the electrode to cool the walls and hence the exposed surface of the electrode.

10. Apparatus as claimed in claim 9 wherein the hollow cylindrical electrode is open-ended and extends between opposed openings in the walls of the pipe means which fit sealingly around the electrode.

11. Apparatus as claimed in claim 10 further comprising clamping means for clamping the electrodes in place, said clamping means arranged to compress the material of the pipe means around said opposed openings against the outer surface of the electrode to provide a fluid-tight seal.

12. Apparatus as claimed in claim 1 wherein each electrode has an exposed surface of platinum.

13. Apparatus as claimed in claim 12 wherein the electrode is made of titanium with a platinum coating on the exposed surface.

* * * * *